United States Patent
Mason

[11] Patent Number: 6,028,508
[45] Date of Patent: Feb. 22, 2000

[54] SYSTEM FOR THE DETECTION OF TIRE TREAD SEPARATION

[76] Inventor: Daniel B. Mason, 4895 Bonita Beach Rd., #108, Bonita Springs, Fla. 34134

[21] Appl. No.: 09/257,397

[22] Filed: Feb. 25, 1999

[51] Int. Cl.[7] .............................. B60C 23/00; E01C 23/00
[52] U.S. Cl. ......................... 340/443; 340/438; 340/445; 340/447; 73/146
[58] Field of Search ..................................... 340/438, 443, 340/444, 445, 446, 447; 73/146, 146.2, 146.4

[56] References Cited

U.S. PATENT DOCUMENTS

| | | | |
|---|---|---|---|
| 4,086,564 | 4/1978 | Claxton | 340/445 |
| 4,089,226 | 5/1978 | Kraska et al. | 73/614 |
| 4,180,794 | 12/1979 | Claxton | 340/443 |
| 5,249,460 | 10/1993 | Dory et al. | 73/146 |
| 5,801,304 | 9/1998 | Cantu | 73/146 |
| 5,845,232 | 12/1998 | Shively et al. | 73/146 |
| 5,895,845 | 4/1999 | Burger | 73/146 |

*Primary Examiner*—Jeffery A. Hofsass
*Assistant Examiner*—Van T. Trieu

[57] ABSTRACT

The system is for use in monitoring one or more vehicle tires to detect the onset of tire tread separation. Tire tread separation occurs when the surface layers of a tire are separated from the underlying body or carcass. The system of the present invention can detect the onset of this condition and warn a driver so that appropriate safety measures can be taken. In its broadest context, the detection system of the present invention includes a sensor for transmitting and receiving a beam of energy; a ranging unit for determining the distance between the sensor and the surface of the tire being monitored; a data acquisition unit for determining when a tire tread separation condition is present; and an alarm for alerting a driver of a dangerous tire tread condition. The system can be use to monitor either one tire or a pair of tires.

4 Claims, 2 Drawing Sheets

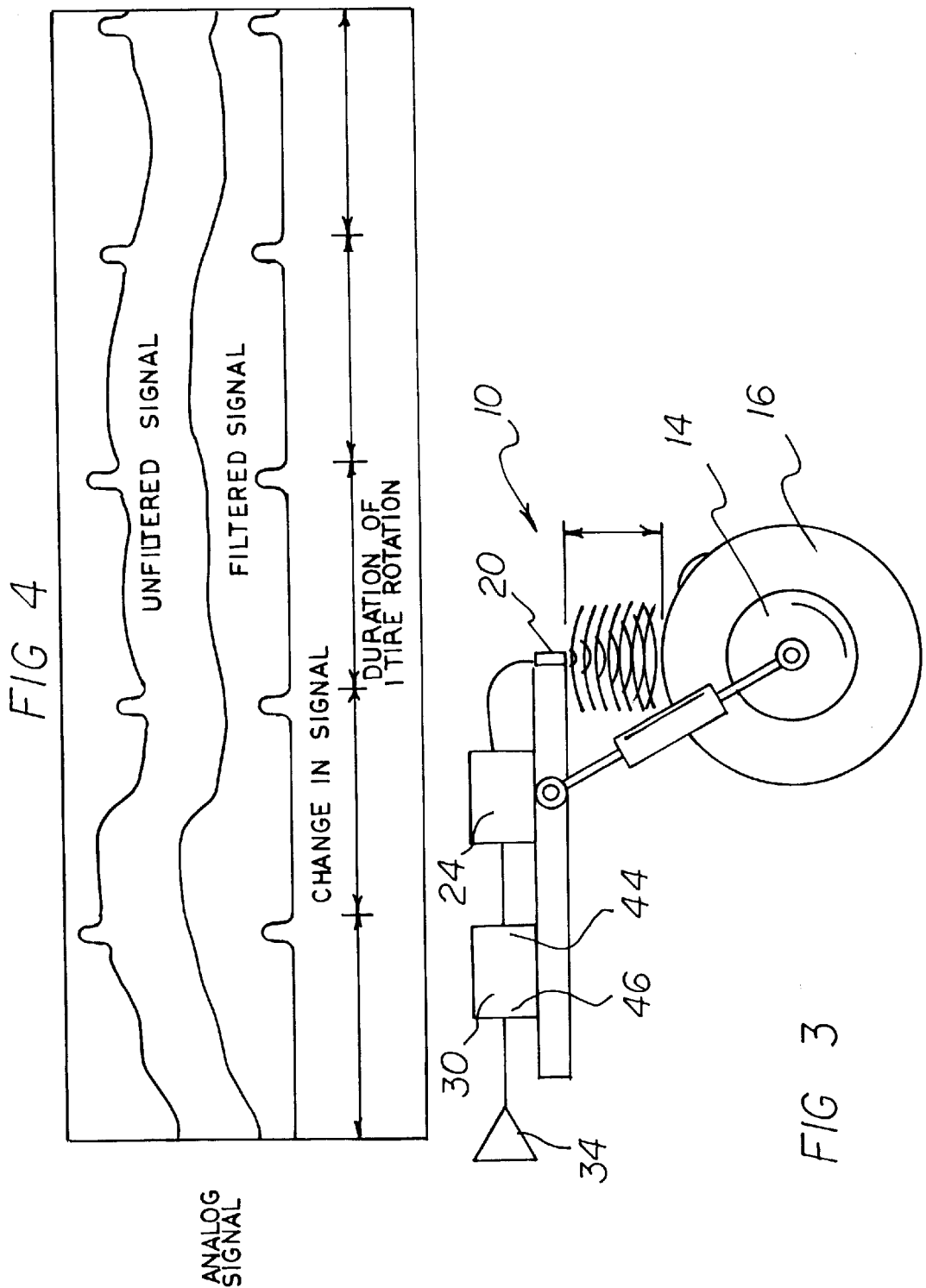

SYSTEM FOR THE DETECTION OF TIRE TREAD SEPARATION

BACKGROUND OF THE INVENTION

1. Field of the Invention

The present invention relates to a tire tread monitoring system and more particularly pertains to a system for detecting the initial signs of tire tread separation while the vehicle is in motion.

2. Description of the Prior Art

The use of tire monitoring and warning devices are known in the prior art. By way of example, U.S. Pat. No. 3,489,998 to O'Neal discloses a pressure warning apparatus for a pneumatic tire. U.S. Pat. No. 3,665,388 to Johnsen illustrates a tire air pressure detection and signalling device. U.S. Pat. No. 3,934,223 to Barabino discloses a tire pressure warning system. U.S. Pat. No. 4,089,225 to Kraska discloses a system for residual tire life prediction. U.S. Pat. No. 4,570,152 to Melon discloses a magnetic tire monitor system. U.S. Pat. No. 4,717,905 to Morrison Jr. discloses a warning system for monitoring a condition such as air. U.S. Pat. No. 4,750,584 to Tanaka discloses a distance measuring device. U.S. Pat. No. 4,814,744 to Collins discloses a low pressure warning system. U.S. Pat. No. 5,436,612 to Aduddell discloses a audible vehicle monitoring apparatus. U.S. Pat. No. 5,793,285 to Wehinger discloses a method and device for monitoring a tire on a vehicle.

In this respect, the monitoring system of the present invention substantially departs from the conventional concepts and designs of the prior art, by providing a means specifically designed to detect the initial signs of tire tread separation while the vehicle is in motion.

SUMMARY OF THE INVENTION

In view of the foregoing functional differences inherent in the known types of tire monitoring systems now present in the prior art, the present invention provides a system specifically designed to detect the initial stages of tire tread separation. As such, the general purpose of the present invention, which will be described subsequently in greater detail, is to continually monitor the surface of a rotating tire for surface variations.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for use in monitoring one or more vehicle tires to detect the onset of tire tread separation. Tire tread separation occurs when the surface layers of a tire are separated from the underlying body or carcass. The system of the present invention can detect the onset of this condition and warn a driver so that appropriate safety measures can be taken. In its broadest context, the detection system of the present invention includes a sensor for transmitting and receiving a beam of energy; a ranging unit for determining the distance between the sensor and the surface of the tire being monitored; a data acquisition unit for determining when a tire tread separation condition is present; and an alarm for alerting a driver of a dangerous tire tread condition. The system can be use to monitor either one tire or a pair of tires.

It is another object of the present invention to provide a system specifically adapted to detect the initial signs of tire tread separation.

It is a further object of the present invention to provide a tire tread monitoring device which is suitable for use upon off road vehicles.

Still another object of the present invention is to provide a tire tread monitoring system which filters out non-repetitive tire motions.

Lastly, it is an object of the present invention to provide a new and improved system for use upon a vehicle for use in detecting tread separation in a vehicle tire. The system is for use in conjunction with at least one vehicle wheel which is supporting a tire to be monitored. The system also includes a sensor secured to the vehicle adjacent to the wheel. The sensor functions to transmit a beam of energy onto the surface of the tire and receive the reflected beam thereafter. A ranging unit is included which is in electrical communication with the sensor. The ranging unit functions to provide electrical power to the sensor. The ranging unit also functions to monitor the transmission and reception of the sensor and measure the time delay between successive transmissions and receptions. Computing means are included within the ranging unit for calculating the distance between the sensor and tire as a function of the time delay. The ranging unit generates an output signal which is proportional to the computed distance between the sensor and tire surface. The system also employs a data acquisition device which is in electrical communication with the ranging unit. The data acquisition device is adapted to receive successive output signals generated by the ranging unit. The data acquisition device monitors the signal generated by the ranging unit and detects significant variations in the signal which is representative of a tire tread separation condition. The data acquisition device generates an alert signal when a tire tread separation condition is sensed. Alerting means are positioned within the vehicle. The alerting means being in electrical communication with, and responsive to, the alert signal generated by the data acquisition device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic illustration of a second embodiment of the present invention.

FIG. 4 is an illustration of an oscilloscope trace of the output of the ranging unit.

Similar reference characters refer to similar parts throughout the several views of the drawings.

DESCRIPTION OF THE PREFERRED EMBODIMENT

Figure 2:
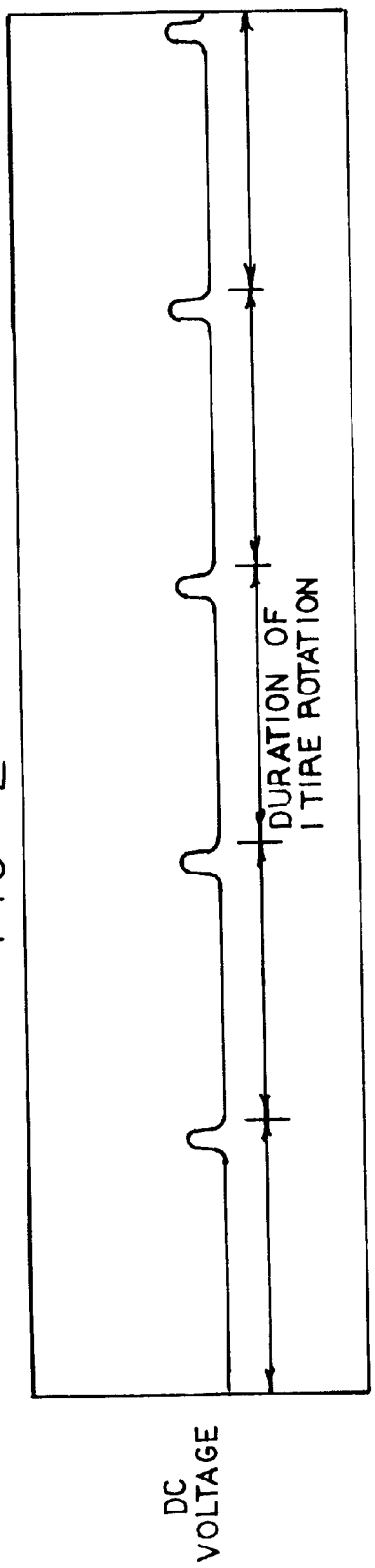
FIG. 2 is an illustration of an oscilloscope trace of the output of the ranging unit.
Figure 1:
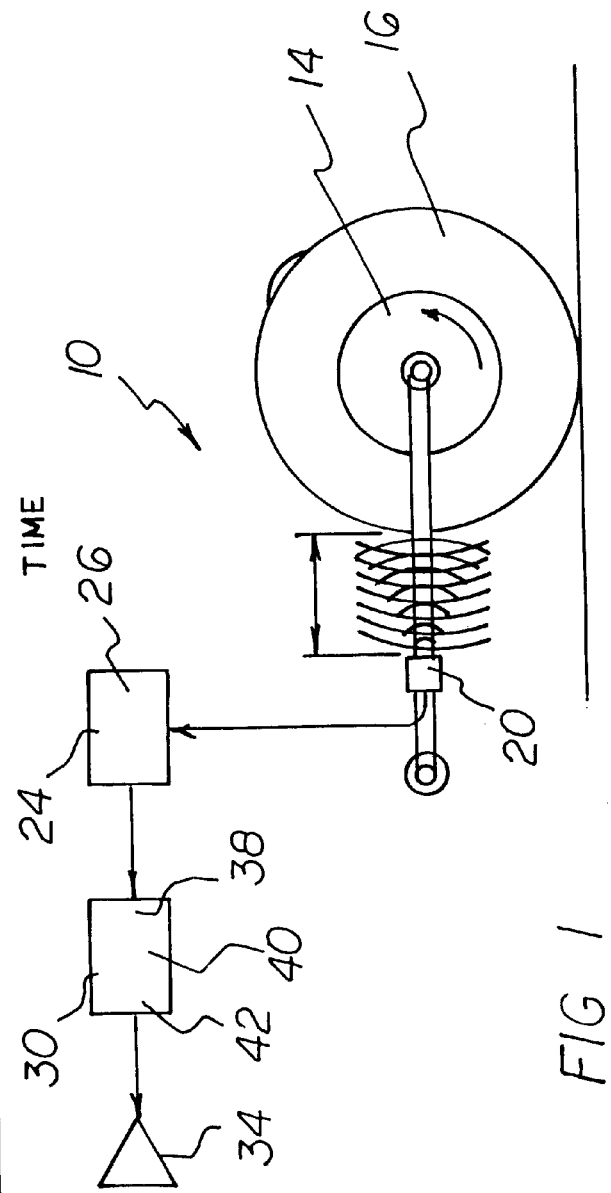
FIG. 1 is a schematic illustration of the first embodiment of the present invention.

With reference now to the drawings, and in particular to FIG. 1 thereof, the detection system of the present invention is illustrated. The system is for use in monitoring one or more vehicle tires to detect the onset of tire tread separation. Tire tread separation occurs when the surface layers of a tire are separated from the underlying body or carcass. The system of the present invention can detect the onset of this condition and warn a driver so that appropriate safety measures can be taken.

In its broadest context, the detection system 10 of the present invention includes a sensor 20 for transmitting and receiving a beam of energy; a ranging unit 24 for determining the distance between the sensor and the surface of the tire being monitored; a data acquisition unit 30 for determining when a tire tread separation condition is present; and an alarm 34 for alerting a driver of a dangerous tire tread condition. The system 10 can be used to monitor either one tire or a pair of tires. Additionally, one or more systems can be employed such that each vehicle tire is adequately monitored. The various components of the present invention, and the manner in which they interrelate, will be described in greater detail hereinafter.

With reference to FIG. 1, the major components of the present invention are depicted. These components include: a sensor 20, a ranging unit 24, a data acquisition device 30, and an alarm 34. As illustrated, the system is adapted to be installed adjacent at least one vehicle wheel which supports a tire 16 to be monitored. The details as to exactly where the system can be installed will be described in greater detail hereinafter. The sensor, however, must be secured to the vehicle and adjacent to the wheel to be monitored. The sensor functions to transmit a beam of energy, such as ultrasonic energy, onto the surface of the tire and receive the reflected beam thereafter. Although a sensor is indicated a transducer can also be utilized. Whichever is provided, it must be capable of emitting pulses of energy at a rate rapid enough to monitor the entire surface of the tire as it is rotating.

The sensor 20 is in electrical communication with the ranging unit 24. This is two-way electrical communication. First, the ranging unit 24 provides electrical drive power to cause the sensor to emit its pulses of energy. Second, the signals which are received from the sensor are converted into electrical energy and sent to the ranging unit. The ranging unit monitors the subsequent transmissions and receptions of the sensor. Furthermore, the ranging unit includes circuitry to measure the time delay between successive transmissions and receptions. Additionally, computing means 26 are employed within the ranging unit for calculating the distance between the sensor and tire as a function of the time delay. Lastly, the ranging unit generates an output signal which is proportional to the computed distance between the sensor and tire surface.

The data acquisition, analysis and alerting device are in electrical communication with the ranging unit. Specifically, the data acquisition device 30 is adapted to accept the voltage or current output signal from the ranging unit. It is within the scope of the present invention to provide a number of ranging units each which transmit data to a central data acquisition device. For each ranging unit, the data acquisition device is adapted to receive successive output signals generated by the ranging unit. The data acquisition device then detects significant variations in the received output signals which are representative of a tire tread separation condition. An alert signal is generated when a tire tread separation condition is sensed.

The alert signal generated by the data acquisition device can be routed to one or more alerting means 34 positioned within the vehicle. Such an alerting means 34 would be in electrical communication with, and responsive to, the alert signal generated by the data acquisition device. The alerting means can take the form of a series of lamps for visually indicating an alarm when a lamp is provided for each tire or pair of dual tires to be monitored. Additionally, a common audible alerting device can be provided as a common alarm for any tire or pair of dual tires to be monitored.

The present invention contemplates two embodiments for the data acquisition device 30. The specific data acquisition device employed would be dependent upon the environment in which the monitored vehicle would operate.

The first embodiment of the data acquisition device is depicted with reference to FIG. 1. In this embodiment, the data acquisition device 30 comprises an input section 38, an analysis section 40, and an alarm section 42. The input section consists of circuitry which is biased, or adjusted, to respond only to the portions of the signal being received from the ranging unit which represent a significant variation in the distance between the sensor and the surface of the tire. The analysis section consists of circuitry which responds only to a continuous train of detected signals from the input section. The alarm section consists of circuitry which responds to a control signal from the analysis section and activates warning devices such as lamps to indicate a tread separation problem on a particular tire or pair of tires and a common audible alarm. This first embodiment may also employ circuitry to allow for a Power On Self Test or POST. The function of the POST sequence is to perform an auto calibration of the distance between the sensor and the surface of the vehicle tire. The POST function eliminates the need for accurate positioning of the sensor or transducer with respect to the tire surface.

The first embodiment is designed for vehicles traveling primarily on paved surfaces. This allows the sensor to be physically mounted to a leading or trailing link which connects the body or chassis of the vehicle to the axle of the wheel 14 to which the tire 16 to be monitored is mounted. This mounting arrangement provides a means to aim the sensor 20 at a fixed position with respect to the rotating perimeter surface of the tire. A suitable mount would be a point on a leaf spring of a solid axle or a positioning arm of an independent suspension unit.

The second data acquisition embodiment is illustrated with reference to FIG. 3. Here, the data acquisition device 30 comprises an analog to digital converter 44 for converting the successive output signals of the ranging unit into a digital data stream. The acquisition device of the second embodiment further includes a CPU 46 for analyzing the digital data stream. The CPU is continually updated with the rate of rotation of the vehicle tire. Thus, the CPU monitoring the data stream can calculate increases or decreases in the distance between the sensor and the surface of the tire which are occurring at the rotational rate of the tire. Thus, the CPU, through an algorithm, can filter out non-repetitive variations in the data being received from the sensor. Ultimately, the data acquisition device generates an alert signal when distances which exceed a predetermined value are calculated.

This second embodiment of the acquisition device is specifically adapted for use upon vehicles traveling on an off road environment. Thus, the sensor, as illustrated in FIG. 3, is mounted to the chassis or body of the vehicle. Namely, the sensor does not need to be mounted at a fixed distance from the tire surface.

FIG. 4 illustrates an oscilloscope trace which approximates the unfiltered and filtered analog signal generated by the ranging unit. The uppermost signal contains non-recurring variations which are the result of vehicle suspension reactions and the like. This unfiltered signal, however, also contains recurring variations which are the result of variations on the surface of the tire. These recurring variations represent the initial signs of tire tread separation. The intermediate signal represents the non-recurring variations which are filtered out by way of the filtering algorithm. Finally, the lowermost signal simply represents the recurring variations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for use upon a vehicle for use in detecting tread separation in a vehicle tire comprising:

at least one vehicle wheel which supports a tire to be monitored;

a sensor secured to the vehicle adjacent to the wheel, the sensor functioning to transmit a beam of energy onto the surface of the tire and receive the reflected beam thereafter;

a ranging unit in electrical communication with the sensor, the ranging unit functioning to provide electrical power to the sensor, the ranging unit also functioning to monitor the transmission and reception of the sensor and measure the time delay between successive transmissions and receptions, computing means within the ranging unit for calculating the distance between the sensor and tire as a function of the time delay, the ranging unit generating an output signal which is proportional to the computed distance between the sensor and tire surface;

a data acquisition device which is in electrical communication with the ranging unit, the data acquisition device adapted to receive successive output signals generated by the ranging unit, the data acquisition device detecting variations in the received output signals which are representative of a tire tread separation condition, the data acquisition device generating an alert signal when a tire tread separation condition is sensed;

alerting means positioned within the vehicle, the alerting means being in electrical communication with, and responsive to, the alert signal generated by the data acquisition device.

2. A system for use upon a vehicle for use in detecting tread separation in a vehicle tire comprising:

a sensor secured to the vehicle adjacent to the wheel, the sensor functioning to transmit a beam of energy onto the surface of the tire and receive the reflected beam thereafter;

a ranging unit in electrical communication with the sensor, the ranging unit functioning to monitor the transmission and reception of the sensor and measure the time delay between successive transmissions and receptions, the ranging unit generating an output signal which is proportional to the distance between the sensor and tire surface;

a data acquisition device which is in electrical communication with the ranging unit, the data acquisition device adapted to receive successive output signals generated by the ranging unit.

3. The system as described in claim 2 wherein:

the data acquisition device comprises an input section, an analysis section, and an alarm section, the input section being biased, or adjusted, to detect only significant variations in the successive output signal generated by the ranging unit, the analysis section responding only to those variations which are continuous, and an alarm section which responds to a control signal from the analysis section.

4. The system as described in claim 2 wherein:

the data acquisition device comprises an analog to digital converter for converting the successive output signals of the ranging unit into a digital data stream, the acquisition device further comprising a Central Processing Unit CPU for analyzing the digital data stream, the CPU being continually updated with the rate of rotation of the vehicle tire, the CPU monitoring the data stream and calculating increases or decreases in the distance between the sensor and the surface of the tire which are occurring at the rotational rate of the tire, the data acquisition device generating an alert signal when distances which exceed a predetermined value are calculated.

\* \* \* \* \*